United States Patent Office 3,842,023
Patented Oct. 15, 1974

3,842,023
POLYMERIC SOLDER COMPOSITION
Taki J. Anagnostou, Livonia, Norman B. Dixon, Grosse Isle, and Gundu M. Sastry, Trenton, Mich., assignors to Chrysler Corporation, Highland Park, Mich.
No Drawing. Continuation-in-part of abandoned application Ser. No. 188,506, Oct. 12, 1971. This application June 25, 1973, Ser. No. 373,573
Int. Cl. C08g 41/04
U.S. Cl. 260—23.7 H                    6 Claims

ABSTRACT OF THE DISCLOSURE

A polymeric composition uniquely suited for functioning as a flexible, tough sealant, as, for example, an automotive body solder. The polymeric composition is the reaction product of a polyfunctional conjugated diolefin having terminally located allylic bromide groups, with an in situ formed curative which is the reaction product of an epoxy containing compound and an amine terminated polyamide. The polymeric composition is a thixotropic sealing-like material which can easily be applied to a metal subsurface and which has excellent adhesive characteristics when fully cured.

CROSS REFERENCE TO RELATED APPLICATION

This application is a continuation-in-part application of U.S. patent application Ser. No. 188,506, filed Oct. 12, 1971 now abandoned and entitled Plastic Solder Composition.

BACKGROUND OF THE INVENTION

This invention relates to a polymeric composition which is an excellent sealant and filler material and which is especially adaptable as a replacement for conventional lead-tin solder. In the past, due to toxicity and pollution problems, numerous attempts have been made to replace conventional lead-tin solders with a thermosetting resinous material. However, these attempts have been unsuccessful for any type of solder application, as for example, automotive body solder, where severe conditions such as wide temperature variations and constant shock and vibration are encountered.

The reason for such failure may be attributed, in general, to poor adhesion and the variation in expansion and contraction of the metal substrate and plastic solder. The adhesion at the bond line with heretofore known compositions is simply not able to withstand any type of severe environmental change and, hence, failure occurs with minor impact phenomenon. In working to overcome the problem it has been found that polymers having the needed adhesive properties are too soft or elastic, while those of sufficient hardness lack the needed degree of adhesion over the necessary temperature range.

SUMMARY OF THE INVENTION

It is an object of this invention to provide new and novel polymeric compositions which are especially useful as body solder and caulking materials.

A futher object is to provide a polymeric solder composition which is economical, easy to apply, readily prepared and which has good pot-life, even in the absence of special precautions.

Other objects and advantages of this invention will be apparent from the ensuing description.

The new polymeric compositions of this invention are based on a unique combination of bromine containing dienic hydrocarbon and epoxy units. Thus, while it has been known that epoxy resins could be cured with amines, the resultant product possesses at high or low temperatures very low flexural strength, impact strength and shear strength. Accordingly, such materials are considered unsuited for use in a vehicle body solder application where substantial vibration, bending and twisting are encountered. On the other hand, olefinic or dienic hydrocarbon polymers, which are known to have excellent flexibility and adhesive characteristics, have suffered the disadvantage of poor tensile strength and hardness due to relatively low cross-linking density and absence of polar groups. In attempting to obtain a single polymer system having the desirable properties of both the epoxy and dienic hydrocarbon based polymers, physical blends of these polymers were prepared without success. Thus, it was not possible to prepare an epoxy-amine-olefin composition of such molecular structure to avoid imparting the brittleness of the epoxy and the softness and elasticity of the olefin to the final cross-linked composition. Moreover, numerous difficulties were encountered such as phasing, loss of adhesion and solvent sensitivity.

The unique compositions of this invention are made possible by our discovery that it is possible to chemically interconnect the epoxy and bromine containing dienic hydrocarbon materials by means of an in situ formed curative with the result that the physical and chemical properties of both materials are unified to a degree such that the resultant polymer composition possesses the most desirable of solder properties. Thus, while physical blends of cured epoxy and dienic hydrocarbon polymers could not be made to exhibit suitable properties for a solder material, it was surprisingly discovered that the epoxy material could be reacted with a certain type of amine, namely, an amine terminated polyamide, with the resultant formation of an intermediate, i.e., an in situ formed curative, which would then react in the presence of heat with the allylic bromide group of the dienic hydrocarbon and result in the chemical interconnection of the epoxy and dienic hydrocarbon material. It was expected that the curing agent amine terminated polyamide would react preferentially to completely cure the epoxy which would be incapable of reacting with the dienic material.

In addition to our discovery that an epoxy containing material and a certain type of amine, namely an amine terminated polyamide would react to form a unique curative intermediate capable of further reaction with a bromine containing dienic hydrocarbon material to produce a composition having unique properties, such properties believed attributable to the presence therein of both covalent bonding, formed by the amine portion of the polyamide reacting with the epoxy, and ionic bonding formed by the amide reacting with the allylic bromide, it was further discovered that it is necessary to heat the bromide containing dienic hydrocarbon and in situ formed curative in order to achieve the necessary interreaction therebetween to produce the properties required for body solder applications such as sandability and adhesion. Thus, it was discovered that heat did not merely accelerate the reaction, but rather, was required in order to drive the reaction to completion.

The new compositions of this invention are prepared from a blend of a liquid olefinically unsaturated polymer of (a) a $C_4$–$C_8$ diolefinic hydrocarbon compound in which a major portion of the molecules contain two separated and terminally located allylic bromide groups, (b) a liquid oxirane containing resin, and (c) a polyfunctional amine terminated polyamide.

It has been found that the amine compound reacts preferentially with the oxirane oxygen forming covalent bonds, and this in situ intermediate curative then reacts in the presence of heat with the allylic bromide containing olefinic material to form a composition which is characterized by excellent adhesive strength with metal, as well as the needed ductility to correlate to the expansion and contraction of the metal substrate. In addition, the compositions of this invention are not adversely affected by the temperature variations encountered with automotive applications, and have been found to readily accept the various paint compositions employed in the automotive industry. Moreover, the compositions have acceptable adhesion to phosphated, non-phosphated and oily coated metallic substrates which are phosphate treatable.

The compositions of this invention may be applied to non-metallic substrates such as vinyl and fiberglass plastic components with good results.

DESCRIPTION OF THE PREFERRED EMBODIMENT

As stated above, the novel compositions of this invention comprise an unique combination of chemically interconnected epoxy and bromine terminated diolefinic hydrocarbons groups. These unique compositions are prepared by blending (a) an olefinically unsaturated liquid polymer of a $C_4$-$C_8$ diolefinic hydrocarbon compound in which a major portion of the molecules are characterized by the presence of two separated and terminally located allylic bromide groups, (b) a liquid epoxy compound having an equivalent weight in the range of about 170 to 210, and (c) a polyfunctional primary amine terminated polyamide.

The olefinically unsaturated polymer used in this invention must be a liquid material as opposed to a solid, with the liquid polymer being defined as having an intrinsic viscosity in toluene at 30° C. in the range of about 0.04 to 1.0 which is inclusive of water-like liquids to viscous Vaseline-like consistency. The preferred materials for use in this invention have intrinsic viscosities of from about 0.2 to 0.4.

The olefinically unsaturated polymer is characterized by the presence of an allylic bromine atom at or near each end of every molecule of the polymer. Naturally, not every molecule necessarily has the allylic bromine and some molecules are monofunctional, having only one terminal group. The bromine content of the polymer should be in the range of about 1 to 15 weight percent of the total weight of the compositions and preferably within the range of 1.5 to 10 weight percent.

The liquid polymer is prepared by causing a $C_4$-$C_8$ diolefinic hydrocarbon compound to polymerize under aqueous emulsion polymerization conditions. The presence of at least about 0.15 mole per 100 moles of monomer, of a compound of the type $Br(Y)CBr_3$ where Y is a radical having a structure selected from the group consisting of

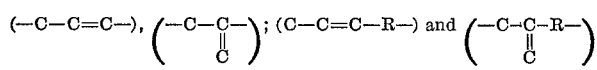

where R is a hydrocarbon or substituted hydrocarbon radical having a molecular weight in the range of from 14 to about 1000.

From the foregoing it will be appreciated that a portion, and preferably a major portion, of the liquid polymer's molecular structure comprises a polymerized $C_4$-$C_8$ dienic hydrocarbon compound. More than one dienic hydrocarbon may be employed to form the dienic portion of the liquid polymer, and when the polymer is a copolymer of a diolefin and a monoolefin, more than one monoolefinic monomer may be used to form the non-dienic portion of the polymer. The $C_4$-$C_8$ dienes which may be employed include conjugated dienes such as butadiene-1,3; 2-methyl butadiene-1,3; pentadiene-1,3; hexadiene-1,3; 2,3-hexadiene-1,3; 2-chloro-butadiene-1,3; and 2,3-dimethyl butadiene-1,3. The monoolefinic monomers which could be employed include styrene, acrylonitrile and methyl methacrylate. In this invention, polymers containing a major proportion of polymerized butadiene are preferred.

The olefinically unsaturated polymers used in this invention and described above are commercially available products and are fully described, including their method of preparation in U.S. Pat. No. 3,506,742.

The epoxy component of this invention may be any type of liquid epoxy compound provided it has an equivalent weight in the range of about 170 to 210. Preferred epoxy compounds are those having a viscosity in the range of about 12,000 to 16,000 cps. at 25° C. and an equivalent weight in the range of about 185 to 196. Representative epoxy compounds for use in this invention include alicyclic polyepoxides such as vinylcyclohexane dioxide, limonene dioxide, dicyclopentadiene dioxide, ethylene-glycol-bis-(3,4-epoxytetrahydro-dicyclopentadien - 8 - yl) ether; epoxidized polybutadienes or copolymers of butadiene with ethylenically unsaturated compounds, such as styrene or vinyl acetate; compounds containing two epoxycyclohexy radicals such as diethylene-glycol-bis-(3,4-epoxycyclohexane carboxylate), bis - 3,4 - (epoxycyclohexylmethyl)-succinate, 3,4 - epoxy-6-methylcyclohexylmethyl 3,4 - epoxy-6 - methylcyclohexane carboxylate and 3,4-epoxyhexahydrobenzal-3,4-epoxycyclohexane-1,1-dimethanol.

Further suitable epoxy materials are polyglycidyl esters, such as are obtained by reacting a dicarboxylic acid with epichlorohydrin or dichlorohydrin in the presence of an alkali. Such polyesters may be derived from aliphatic dicarboxylic acids such as succinic or adipic acid, or preferably from aromatic dicarboxylic acids such as phthalic or terephthalic acid. As suitable examples there may be mentioned diglycidyl adipate and diglycidyl phthalate.

Also useable are polyglycidyl ethers such as are obtained by etherifying a dihydric or polyhydric alcohol, or tiphenol or polyphenol respectively, with epichlorohydrin or dichlorohydrin in the presence of an alkali. These compounds may be derived from glycols such as ethyleneglycol, diethyleneglycol, triethyleneglycol, 1,2-propyleneglycol, 1,3-propyleneglycol, 1,4-butyleneglycol, 1,5-pentanediol, 1,6-henanediol, 2,4,6-hexanetriol, glycerol and especially from diphenols or polyphenols such as resorcinol, pyrocatechol, hydroquinone, 1,4 - dihydroxynaphthalene, phenolformaldehyde condensation products of the resol or novolak type, bis-(para-hydroxyphenyl)-methane, bis - (para-hydroxphenyl) - methylphenyl-methane, bis-(parahydroxyphenyl)-tolylmethane, 4,4' - di-hydroxydiphenyl, bis-(parahydroxyphenyl)-sulfone or especially from bis-(parahydroxyphenyl)-dimethylmethane. Particularly suitable epoxy resins are those from the diglycidylether of bis-(para-hydroxyphenyl)-dimethylmethane (Bisphenol A).

The epoxy and conjugated bromine terminated diolefinic hydrocarbon material are chemically interconnected by means of a polyfunctional primary amine terminated polyamide.

It has been found that totally unique and unexpected properties are obtained in the final product through the use of an amine terminated polyamide. No other type of amine has been found to provide the combination of properties necessary for an automotive body solder. It is believed that the amine must possess amide structures within its polymeric backbone to provide ionic bonding in addition to the covalent bonds which normally form when an amine reacts with the oxirane oxygen of the epoxy material.

Suitable amine terminated polyamide materials for use in this invention are the reaction products of aliphatic polyamines and dicarboxylic acids. The amine terminated polyamide should be in the liquid state within the appropriate temperature range of 20 to 30° C. Materials of this type are well known and are disclosed in U.S. Pats. 2,379,413 and 2,450,940.

The aliphatic polyamine component used to synthesize the amine terminated polyamide must be of an aliphatic structure, however, the acid component can be either aliphatic, aromatic or heterocyclic. Neither the aliphatic polyamine nor the carboxylic acid should contain a tertiary amine within their structure since it may interfere with the basic reaction between the epoxy compound and amine terminated polyamide. Examples of suitable polyamines from which to synthesize the amine terminated polyamide include propylene diamine, ethylene diamine, hexamethylene diamine, menthane diamine, triethylene tetramine, 1,3-propane diamine, 1,3-diamino butane and 1,4-diamino butane. Carboxylic acids useful in preparing the amine terminated polyamide include sebacic acid, succinic acid, azelaic acid, glutaric acid, adipic acid and isophthalic acid. The preferred primary amine terminated polyamide for use in this invention has an amine equivalent weight of about 130 to 160, and is the reaction product of triethylene tetramine and a dimerized fatty acid. Other excellent amine terminated polyamide materials for use in this invention include the condensation product of hexamethylene diamine and a dimer fatty acid, sebacic acid and 1,4-butane diamine, of hexahydro phthalic acid and menthane diamine and adipic acid and dimer diamine which is a commercially available material of the structure $H_2N$-D-$NH_2$ wherein D is a 36 carbon atom chain.

The compositions of the present invention are prepared by dispensing suitable pigments or additives in a first component A which is the brominated olefin and epoxy and a second component B which is the polyfunctional amine terminated polyamide. These dispersions are prepared in equipment in which a vacuum environment can be created such as a Nautta or Baker-Perkins mixer. Components A and B are then mixed just prior to application. As indicated earlier, the diolefinic hydrocarbon, amine terminated polyamide and epoxy should be liquids when at temperatures in the range of 20–30° C. No special temperature requirements need be observed during blending, however deaeration is facilitated by mixing the pigment dispersion at a temperature in the range of 120°–170° F. Care should be taken to prevent air entrapment and, therefore, the blending mixing should be carried out under a vacuum environment.

The ratio of the amount of the conjugated diolefin hydrocarbon to that of the epoxy in the compositions of the invention may range from about 30:70 to about 70:30 based on the weights of said diolefin and epoxy. The amine terminated polyamide component is preferably employed in a concentration of from about one to five parts by weight of the amine for each five parts of a mixture of the conjugated diolefin hydrocarbon and epoxy components.

Various fillers, tackifiers, antioxidants and similar additives may be employed in the composition such as carbon blacks, finely divided metals, asbestos, silica, quartz and metal oxides. Such materials should be thoroughly mixed with the liquid polymer during blending of the principal components. Upon blending, the compositions of this invention formulated for use as a body solder have the consistency of a grease or Vaseline-like material which can be readily handled and applied.

As indicated above, it has been discovered that in the absence of heating the diolefinic hydrocarbon, amine terminated polyamide and epoxy blend, only the general surface hardens while the interior of the blend remains soft. Apparently, in the absence of external heating the epoxy reacts with the amine terminated polyamide to form the intermediate curative. However, this curative does not react with the allylic bromide groups of the diolefinic hydrocarbon in the absence of some external heating. Naturally, the amount of heat required is a function of the specific compounds employed in the blend.

The following examples, in which all parts given are by weight unless otherwise indicated, will further illustrate the invention.

EXAMPLE I

This example shows the necessity for supplying heat to the final solder composition blend in order to effect complete cure. Thus, while the initial reaction between the epoxy and polyamide amine takes place quickly and at ambient temperatures, the thus formed curative must then further react with the diolefinic hydrocarbon component. This latter reaction is sluggish due to the high molecular weight of the reactive center, with sluggishness allows for migration of the polymeric systems to occur. Such migration or phasing can be visibly observed upon sectioning a sample which is exposed only to ambient temperatures. Further evidence of phasing and incomplete cure is the decreased hardness present in the interior of the sample.

To illustrate the requirement for heating the blend of this invention a polymer mixture was prepared by mixing in a Baker-Perkins mixer at room temperature and under a vacuum of about 25 inches of mercury, 60 parts of dibromopolybutadiene, having an intrinsic viscosity in toluene at 30° C. of about 0.3 and a bromine content of about 7 weight percent of the total weight of the polymer and 40 parts of the diglycidyl either of Bisphenol A which had an epoxy equivalent weight of about 188 and a viscosity of 14,000 cps. at 25° C.

Into a separate vessel was introduced an amine terminated polyamide having an amine value of 385 (amine equivalent weight 142). The polyamide curative was the condensation product of a dimer fatty acid and triethylene tetramine. The mixing was conducted under vacuum at room temperature.

A body solder composition was then prepared by blending 33 parts of the above curative for each 100 parts of the above prepared polymer mixture. A number of discs of approximately one-half inch thickness were then formed from the resulting Vaseline consistency-like mixture for the purpose of determining the hardness of the composition after certain cure temperatures and periods. The following data are Shore Durometer Hardness—Type D-2 under a 15 kg. weight. This test was performed in conformity with ASTM D-1706-61.

| Time | Room temp. | Temperature, degrees (F.) | | | | | | | |
|---|---|---|---|---|---|---|---|---|---|
| | | 110 | 130 | 158 | 170 | 190 | 225 | 300 | 350 |
| 5 min | | s | s | s | s | s | s | 60 | 62 |
| ½ hr | s | s | s | 40 | 50 | 52 | 55 | 62 | 64 |
| 1 hr | s | s | 32 | 50 | 52 | 53 | 58 | 65 | 65 |
| 2 hrs | s | 25 | 45 | 58 | 58 | 58 | 58 | 65 | 67 |
| 20 hrs | 45 | 30 | 58 | 62 | 64 | 65 | 63 | 68 | 71 |
| 94 hrs | 58 | 53 | 61 | 62 | 66 | 68 | 65 | 69 | |
| 118 hrs | 54 | 49 | 61 | | | | | | |
| 142 hrs | 54 | 49 | 62 | 62 | 67 | 68 | 67 | 69 | |
| 142 hrs.[1] | 42 | | 50 | 53 | 53 | 49 | 60 | 59 | 68 | 70 |

[1] Surface ground to ¼".

NOTE.—s=soft.

The real significance of the foregoing data is seen in the bottom column of figures which were obtained when the center of the test discs were exposed to the weight by removing one-quarter inch or one-half of the disc by grinding. An adequate hardness for solder purposes is a value of about 58. Accordingly, it can be seen that even after a period of 142 hours, a cure was not achieved below a temperature of about 190° F. Again, it will be appreciated that the specific cure temperature in this example was for the cited composition and that the cure temperature will vary with the composition employed.

Shear data obtained on the cited composition based on one-quarter inch adhesive gap also shows the criticality of temperature: room temperature cure for 24 hours less than 50 p.s.i., for 48 hours at room temperature 850 p.s.i., for 142 hours at room temperature 930 p.s.i. In contrast, five minute cure at 300° F. gives a shear of 1650 p.s.i.

EXAMPLE II

A polymer mixture was prepared by mixing in a Baker-Perkins mixer at room temperature and under a vacuum of about 25 inches of mercury, 60 parts of dibromopolybutadiene, having an intrinsic viscosity in toluene at 30° C. of about 0.3 and a bromine content of about 7 weight percent of the total weight of the polymer, 40 parts of the diglycidyl ether of Bisphenol A which had an epoxy equivalent weight of about 188 and a viscosity of 14,000 cps. at 25° C. and four parts of acid washed asbestos.

In a separate vessel a curing system was prepared by mixing 70 parts of an amine terminated polyamide resin having an amine value of 385 (amine equivalent weight 142) and seven parts of acid washed asbestos. The polyamide resin was the condensation product of a dimer fatty acid and triethylene tetramine. The mixing was conducted under vacuum at room temperature.

A body solder composition was then prepared by blending 4.2 parts of the above prepared curing system for each ten parts of the above prepared polymer mixture. The resulting Vaseline-like mixture was then placed on a seam of an unpainted vehicle body and cured in four minutes to a sandable state by heating with a 250 watt infrared lamp. The composition had a pot life of about fifty minutes at 25° C. and exhibited a tensile strength when applied to Bonderized cold roll steel of about 1500 p.s.i. after a further cure of thirty minutes at 300° F.

EXAMPLE III

An excellent vehicle body solder was prepared by first blending at room temperature and under vacuum a polymer mixture consisting of 21 parts of dibromopolybutadiene and 14 parts of the diglycidyl ether of Bisphenol A, these two components being identical to that described in Example I, 16 parts of the crystalline silica and two parts of hyrophobic fumed silica. The silica components were found helpful in increasing the resistance of the body solder to humidity. A curing system was separately prepared under vacuum and at room temperature by blending thirty parts of the polyamide resin described in Example I with 42 parts of acicular zinc oxide and one part of organophilic fumed silica which is a thixotropic agent. The acicular zinc oxide was found to greatly reinforce the resultant solder and also prevent cracking of paints which were applied over the solder.

The final body solder composition was then prepared as in Example I by blending 2.4 parts of the polymer mixture with one part of the curing system.

We claim:

1. A sealant composition produced by heating to a minimum temperature of about 190° F. a mixture comprising (a) an olefinically unsaturated liquid polymer of a $C_4$–$C_8$ diolefinic hydrocarbon compound, a major proportion of molecules of said polymer being characterized by the presence of two separated and terminally located allylic bromide groups within their structure, (b) a liquid epoxy compound having an equivalent weight in the range of about 170 to 210, and (c) a polyfunctional amine terminated polyamide having an amine equivalent weight of about 130 to 160, said olefinically unsaturated liquid polymer and said liquid epoxy compound being present in said mixture in the weight ratio of (a) to (b) of from 30:70 to 70:30, and wherein there is from about one to five parts of said amine terminated polyamide for each five combined parts of said polymer and epoxy compound.

2. A sealant composition according to claim 1 wherein the $C_4$–$C_8$ diolefinic hydrocarbon compound is selected from the group consisting of butadiene-1,3; 2-methyl butadiene-1,3; pentadiene-1,3; hexadiene-1,3; 2,3-hexadiene-1,3; 2-chlorobutadiene-1,3; and 2,3-dimethyl butadiene-1,3, and wherein the bromine content of the polymer is in the range of about one to fifteen weight percent of the total weight of the polymer.

3. A sealant composition according to claim 1 wherein said olefinically unsaturated liquid polymer is a polymer obtained from polymerizing a $C_4$–$C_8$ diolefinic hydrocarbon compound selected from the group consisting of butadiene-1,3; 2-methyl butadiene-1,3; pentadiene-1,3; hexadiene-1,3; 2,3-hexadiene-1,3; 2-chloro-butadiene-1,3; and 2,3 - dimethyl butadiene - 1,3 in the presence of a compound of the structure $BR(Y)CBr_3$ wherein Y is a hydrocarbon radical comprising a $C_4$–$C_8$ diolefinic hydrocarbon monomer unit having a molecular weight in the range of about 54 to 1000.

4. A sealant composition according to claim 1 wherein said epoxy compound has an equivalent weight in the range of about 185 to 196 and a viscosity in the range of 12,000 to 16,000 cps. at 25° C.

5. A sealant composition according to claim 1 wherein said polyfunctional amine terminated polyamide has an equivalent weight in the range of about 130 to 160 and is the condensation product of triethylene tetramine and a dimer fatty acid.

6. The solder composition of claim 1 wherein said olefinically unsaturated liquid polymer has an intrinsic viscosity in the range of 0.2 to 0.4 when measured in toluene at 30° C.

References Cited
UNITED STATES PATENTS

| | | | |
|---|---|---|---|
| 3,529,036 | 9/1970 | Edwards | 260—836 |
| 3,297,608 | 1/1967 | Noshay et al. | 260—23.7 |
| 3,370,104 | 2/1968 | O'Brien et al. | 260—23.7 |
| 3,311,515 | 3/1967 | Weller et al | 260—18 |

MAURICE J. WELSH, JR., Primary Examiner

E. C. RZUCIDLO, Assistant Examiner

U.S. Cl. X.R.

260—18 EP, 18 PN, 23.7 R, 23.7 N, 37 EP, 41.5 R, 836, 887 R